(12) United States Patent
Janakiram et al.

(10) Patent No.: US 12,107,959 B2
(45) Date of Patent: Oct. 1, 2024

(54) COLOSSEUM, A SCALABLE AND BYZANTINE-FAULT TOLERANT CONSENSUS MECHANISM FOR PERMISSIONED SYSTEMS

(71) Applicant: INDIAN INSTITUTE OF TECHNOLOGY MADRAS (IIT MADRAS), Chennai (IN)

(72) Inventors: Dharanipragada Janakiram, Chennai (IN); Himanshu Gupta, Chennai (IN)

(73) Assignee: INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 275 days.

(21) Appl. No.: 17/621,112

(22) PCT Filed: Jun. 5, 2020

(86) PCT No.: PCT/IN2020/050501
§ 371 (c)(1),
(2) Date: Dec. 20, 2021

(87) PCT Pub. No.: WO2020/255158
PCT Pub. Date: Dec. 24, 2020

(65) Prior Publication Data
US 2022/0353080 A1  Nov. 3, 2022

(30) Foreign Application Priority Data
Jun. 20, 2019  (IN) .............. 201941024497

(51) Int. Cl.
*H04L 9/32* (2006.01)
*G06N 7/01* (2023.01)
*H04L 9/00* (2022.01)

(52) U.S. Cl.
CPC ............. *H04L 9/3218* (2013.01); *G06N 7/01* (2023.01); *H04L 9/3236* (2013.01); *H04L 9/50* (2022.05)

(58) Field of Classification Search
CPC ....... H04L 9/3218; H04L 9/3236; H04L 9/50; H04L 63/02; G06N 7/01; G06F 21/6218; G06F 21/64
See application file for complete search history.

(56) References Cited

U.S. PATENT DOCUMENTS

2018/0005186 A1  1/2018  Hunn
2018/0331835 A1* 11/2018  Jackson ................ H04L 9/3297
2018/0341930 A1  11/2018  Moir et al.

FOREIGN PATENT DOCUMENTS

WO    WO-2018224955 A1 * 12/2018 ......... G06F 16/1837

OTHER PUBLICATIONS

Gupta et al., "Colosseum: a Scalable Permissioned Blockchain over Structured Network", Jul. 8, 2019, pp. 23-25 (Year: 2019).*
Janakiram et al., "CDAG: a Serialized blockDAG for Permissioned Blockchain", Oct. 24, 2019 (Year: 2019).*
Li et al., "Proof of Vote: a High-Performance Consensus Protocol Based on Vote Mechanism & Consortium Blockchain", 2017 IEEE 19th International Conference on High Performance Computing and Communications, pp. 466-473 (Year: 2017).*

(Continued)

*Primary Examiner* — John B King
(74) *Attorney, Agent, or Firm* — Morgan, Lewis & Bockius LLP

(57) ABSTRACT

This invention provides Colosseum, a Byzantine fault tolerant scalable method to achieve consensus, designed to maintain distributed ledgers over a permissioned peer-to-peer blockchain network that follows a curative approach towards achieving consensus. It assumes that adversaries are not always present in the system but efficiently detects malicious behaviour and alert the network. Colosseum follows a knockout tournament like approach over a structured ring network to have agreement on the next set of block proposers. Colosseum proposes a novel two-player game like approach which uses Proof-of-Win to eliminate nodes in each round of a tournament resulting in the selection of a (Continued)

subset of nodes after α (α<log 2 N, where N is the number of nodes in the network) number of rounds. It allows multiple block proposers for a tournament and tries to commit a maximum of their blocks using Converging Directed Acyclic Graph (CDAG) as the ledger to increase the throughput of the transactions.

14 Claims, 4 Drawing Sheets

(56) References Cited

OTHER PUBLICATIONS

Yuen et al. "Proof-of-Play: a Novel Consensus Model for Blockchain-based Peer-to-Peer Gaming System", Jul. 8, 2019, pp. 19-28 (Year: 2019).*

Yu et al., "A Survey of Consensus and Incentive Mechanism in Blockchain Derived from P2P", 2018, 2018 IEEE 24th International Conference on Parallel and Distributed Systems (ICPADS), pp. 1010-1015 (Year: 2018).*

Bencic, Federico M. et al., Distributed Ledger Technology: Blockchain Compared to Directed Acyclic Graph, 2018 IEEE 38th International Conference on Distributed Computing Systems (ICDCS), Jul. 23, 2018 (6 pages).

* cited by examiner

COLOSSEUM, A SCALABLE AND BYZANTINE-FAULT TOLERANT CONSENSUS MECHANISM FOR PERMISSIONED SYSTEMS

CROSS-REFERENCE TO RELATED APPLICATIONS

The present application is the national stage of International Patent Application No. PCT/IN2020/050501, filed on Jun. 5, 2020, which claims the benefit of and priority to Indian Patent Application No. 201941024497 filed on Jun. 20, 2019, both of which are incorporated herein by reference in their entirety.

FIELD OF INVENTION

This invention is in the field of block chain technology. Particularly, Colosseum, a method to achieve consensus that can scale, and maintain distributed ledgers over a permissioned peer-to-peer blockchain network with Byzantine fault tolerance.

BACKGROUND OF THE INVENTION

The following on the background of the invention is intended only to facilitate an understanding of the present invention.

Byzantine failures are considered the most general and most difficult class of failures among the failure modes. The so-called fail-stop failure mode occupies the simplest end of the spectrum. Whereas fail-stop failure mode simply means that the only way to fail is a node crash, detected by other nodes, Byzantine failures imply no restrictions, which means that the failed node can generate arbitrary data, pretending to be a correct one. Thus, Byzantine failures can confuse failure detection systems, which makes fault tolerance difficult. Despite the analogy, a Byzantine failure is not necessarily a security problem involving hostile human interference: it can also arise from electrical faults In a Byzantine fault, a component such as a server can inconsistently appear both failed and functioning to failure-detection systems, presenting different symptoms to different observers. It is difficult for the other components to declare it failed and shut it out of the network, because they need to first reach a consensus regarding which component has failed in the first place. 'Byzantine fault tolerance' is the ability to defend against failures of system components with or without symptoms that prevent other components of the system from reaching an agreement among themselves, where such an agreement is needed for the correct operation of the system. Remaining correctly operational components of a Byzantine fault tolerant system will be able to continue providing the system's service as originally intended, assuming there are sufficiently many accurately operating components to maintain the service.

In U.S. Pat. No. 9,807,106 B2 titled "MITIGATING BLOCKCHAIN ATTACK" discloses a computer implemented method for detecting malicious attacks presenting a threat to a blockchain associated with a blockchain data structure of a computing device. Again, it is complicated and had limited applications.

In general, permissioned blockchains use methods based on voting to reach consensus. They work on an assumption that adversaries are always present in the system and follows a preventive approach of having a majority vote on each batch of transactions added to the ledger. Achieving scalability for such methods is hard because of their high message complexity and thus, have a limited number of applications. Use cases like banking and healthcare blockchain requires a scalable design to maintain the consistency of the ledger and ensure its safety.

There are various researches on-going to have a scalable method, which is simple and have wide range of applications. The shortcomings of the prior art are overcome, and additional advantages are provided through the invention and method of present disclosure.

OBJECT OF THE INVENTION

The main object of the invention is to provide a Byzantine fault tolerant, scalable method to achieve consensus, designed to maintain distributed ledgers over a permissioned peer-to-peer blockchain network.

SUMMARY OF THE INVENTION

This invention provides Colosseum, a Byzantine fault tolerant scalable method to achieve consensus, designed to maintain distributed ledgers over a permissioned peer-to-peer blockchain network that follows a curative approach towards achieving consensus. It assumes that adversaries are not always present in the system but efficiently detects malicious behaviour and alert the network. Colosseum follows a knockout tournament like approach over a structured ring network to have agreement on the next set of block proposers. Colosseum proposes a novel two-player game like approach which uses Proof-of-Win to eliminate nodes in each round of a tournament resulting in the selection of a subset of nodes after $\alpha$ ($\alpha < \log 2\, N$, where N is the number of nodes in the network) number of rounds. It allows multiple block proposers for a tournament and tries to commit a maximum of their blocks using Converging Directed Acyclic Graph (CDAG) as the ledger.

BRIEF DESCRIPTION OF THE DRAWINGS AND FIGURES

It is to be expressly understood, that each of the following figures is provided for the purpose of illustration and description only and is not intended as a definition of the limits of the present disclosure.

FIG. 1 proof of win for a match

Figure 4:
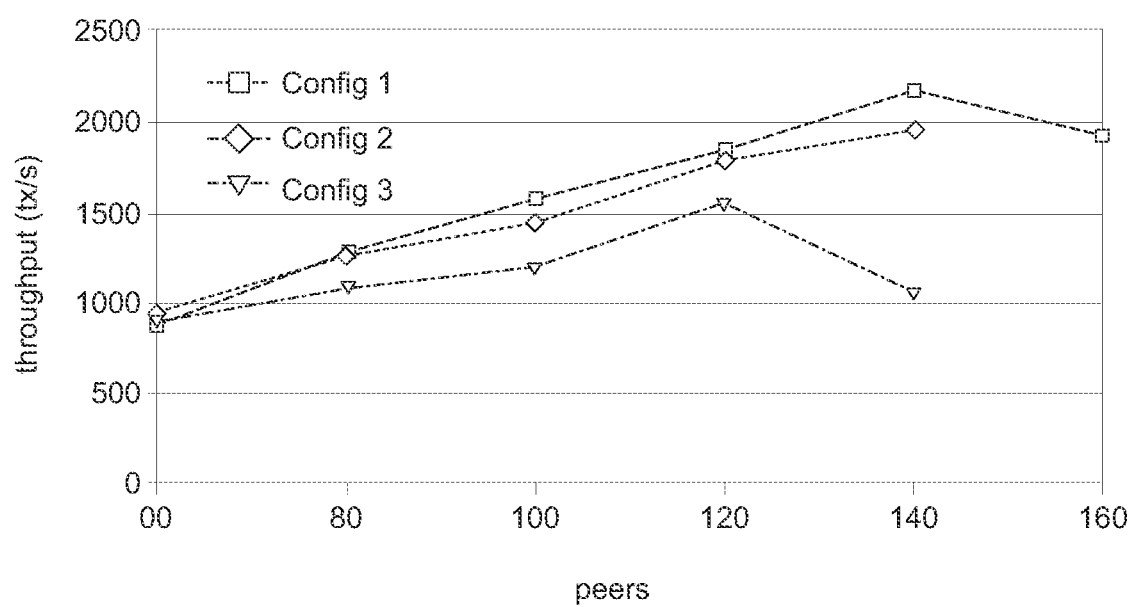

FIG. 4 throughput for $\alpha=3$

Figure 5:
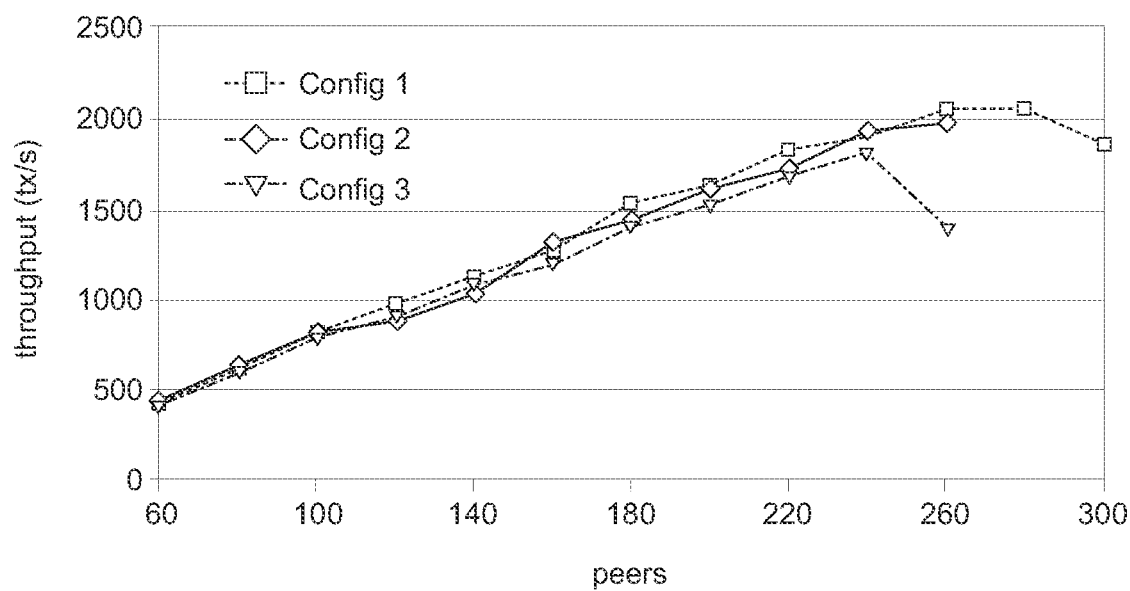

FIG. 5 Throughput for $\alpha=4$

DETAILED DESCRIPTION

The foregoing has broadly outlined the features and technical advantages of the present disclosure in order that the detailed description that follows may be better understood. Additional features and advantages of the disclosure will be described herein after which form the subject of the claims of the disclosure. It should be appreciated by those skilled in the art that the conception and specific aspect disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the following details of the accompanying drawings. One or more embodiments are described in the later part, by way of example, with reference to the accompanying drawings.

All publications, patents and patent applications cited herein, whether supra or infra, are hereby incorporated by reference in their entirety to the same extent as if each individual publication, patent and patent application is specifically and individually indicated to be incorporated by reference.

Unless defined otherwise, all technical and scientific terms used herein have the same meaning as commonly understood by one of ordinary skill in the art to which the invention pertains.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

The present invention describes a method Colosseum, a scalable consensus technique designed for permissioned blockchains. At the core, it uses synchronous knockout approach over a Distributed Hash Table (DHT) [1] to agree on the next set of block proposers. To propose a block, participants play matches of a novel two-player game to eliminate others and qualify. It introduces Proof-of-Win (PoWin) as a verifiable, tamper-proof certificate for the result of matches and use it to store the state of nodes over the DHT.

Permissioned blockchains generally use methods based on voting to reach consensus. They work on an assumption that adversaries are always present in the system and follows a preventive approach of having a majority vote on each batch of transactions added to the ledger. Achieving scalability for such methods is hard because of their high message complexity and thus, have a limited number of applications. Use cases like banking and healthcare blockchain requires a scalable design to maintain the consistency of the ledger and ensure its safety.

Colosseum introduces Converging Directed Acyclic Graph (CDAG) as an alternative to the blockchain and blockDAG structures to commit multiple blocks of transactions simultaneously to the ledger and converge them at each step providing finality to the blocks.

Moreover, Colosseum uses bucketing of transactions to prevent simultaneous proposers from generating conflicting blocks and introduces a distributed time barrier to grant enough time for the blocks to disseminate in the network.

A tournament in Colosseum consists of log 2 N (N is the number of participants) asynchronous rounds. Nodes play matches in pair of two for each round and accept the winners of $\alpha$ ($\alpha$<log 2 N) number of rounds as the proposers for that tournament. The elected proposers can then propose a block for the blockchain and propagate them in the network along with their PoWin.

Colosseum elects multiple block proposers in each tournament to propose blocks for the ledger. It divides the transactions into multiple buckets based on their hashes to enable the proposers to generate non-conflicting blocks from different buckets. It also introduces Converging Directed Acyclic Graph (CDAG) as the structure for the ledger to support the addition of multiple simultaneous blocks and helps them converge at the next step providing finality to the blocks. CDAG is a hybrid structure of blockchain [2] and blockDAG [3], designed to achieve the serialization of blockchain (to progress as a chain) and the parallel nature of blockDAG (to enable addition of multiple concurrent blocks to the ledger). Moreover, Colosseum also introduces a Proof of Elapsed Time [4] based distributed time barrier to divide the timeline into slots. The barrier makes the nodes to individually wait for a particular time after the start of a tournament to prevent the nodes from moving ahead of others. It helps CDAG to converge better at each step as blocks get adequate time to disseminate in the network.

Accordingly, the principal embodiment of this invention is a scalable and Byzantine fault tolerant method to reach consensus on the next set of block proposers in permissioned blockchain systems comprising the steps of;
  a. forming pair of nodes and generating their respective block proposals,
  b. validating the game proposals from the involved nodes of step (a) by Validator, and generating proof of win (PoWin) certificate as result, and
  c. storing the PoWin from step (b) by Keeper and verifying that the nodes are forming authorized pairs.

Another embodiment of this invention is the Pairing of nodes in step (a) is not absolute, pairing is on the fly to avoid targeted attacks by malicious opponents.

Yet another embodiment of this invention is for pairing in step (a), the nodes send TCP requests to other nodes on the ring to pair and provide the PoWin of the previous round as a token of their eligibility.

In yet another embodiment of this invention, in step (a) of this method after pairing, the confirmation nodes generate their block proposal by signing common string $S_{ABtr}$ with their (digital signature) private key $p_k$ to generate proposed string (PS).

A further embodiment of this invention, in step (b) of this method Validator compares the PS of both the nodes with its signed $S_{ABtr}$ and the node with the value closer to that of the validator earns the PoWin.

In still another embodiment of the present invention the validator is a random third party in the network uniquely identifiable for a match.

In another embodiment of this invention the validation process is delegated to prevent the nodes from leaving the method in-between.

Yet another embodiment of this invention, in step (c) of the method the 'Keeper' stores the PoWin as verifiable and tamper-proof state of users over a Distributed Hash Table (DHT).

In an embodiment of this invention the DHT restricts the nodes (already lost or not eligible) from pairing unauthorized matches; as the verification process which is independent of the nodes will identify any wrongful attempt and notify with verifiable proofs.

A further embodiment of this invention is the 'Keepers' are different for every pair to evade any malicious or attack by adversary.

In a further embodiment of this method in step (c) for verification the keeper will;
  d. query the previous round keepers (multiple replicas) of the nodes included in a PoWin by keepers (all replicas) of a match,
  e. ensure both the nodes pairing in $r_{th}$ round must have won earlier $(r-1)_{th}$ round,
  f. querying keeper collecting the PoWin for round r as a proof for a valid query (i.e., node has played the $r_{th}$ round), and the queried keeper reply with the PoWin of round r−1 to confirm the previous victory of the nodes.
  g. In the absence of proof with the queried keeper and query is valid, it broadcasts a negative vote against the pair and queries the previous keeper using the same proof.
  wherein, the match is considered as a foul when a majority (>⅔rd of keepers) of negative votes from valid keepers are against it.

In a preferred embodiment of the present invention, a new structure to store blocks in a distributed ledger across peer-to-peer networks proposed by the block proposers selected using the method is Converging Directed Acyclic Graph (CDAG).

Yet another embodiment of this invention, the structure progresses by adding (Converging block) C-Block (FIG. 3) to the structure of blockchain to give the ability to commit multiple blocks simultaneously and by bucketing of transactions to minimize the conflicts.

Still another embodiment, the C-Block is the converging point in CDAG allowing the current block proposers to refer multiple blocks with a single link and enables different proposers to have the same view about the ledger.

As an embodiment of this invention, the C-Block is characterised by following set of rules:
  a. belong to different buckets, to ensure that a C-Block does not contain conflicting blocks due to the presence of the same transactions;
  b. have non-conflicting transactions, to avoid any double spending transactions in a C-Block, and
  c. refer to the same previous C-Block, providing the serial nature to CDAG.

As an embodiment to the structure, the number of qualifying proposers is inversely proportional to α.

In a further embodiment to the structure, for larger values of α the saturation point shifts to a higher number of nodes, allowing CDAG to scale with the number of nodes.

The invention is now illustrated by various examples and accompanying drawings, which are not meant to limit the scope of the invention in any manner. All embodiments that may be obvious to a skilled person would fall within the scope of the present invention.

EXAMPLES

Example 1

1. Knockout Tournaments

Tournaments in Colosseum are the basis for the selection of block proposers. Users participate in these tournaments to qualify and propose blocks for the ledger. A tournament consists of multiple asynchronous rounds. Users play matches of a two-player game for each round to win and move forward and receive PoWin as the certificate of their win. Nodes with valid PoWin advance to the next round and the winners of α<log(N) (N is the number of participants) number of rounds are eligible to propose a block in Colosseum.

The two-player game plays a vital role in maintaining the integrity of the system. It is a process to select a random winner amongst two participants and rely on random nodes in the network for validation and verification. The randomness of the game comes from the cryptography involved to generate the game proposals and Ids of the third-party nodes on the ring. The dependency on random nodes in the network prevents a player to defraud others and ensures fairness among the players.

1.1 Proof-of-Win

Figure 1:
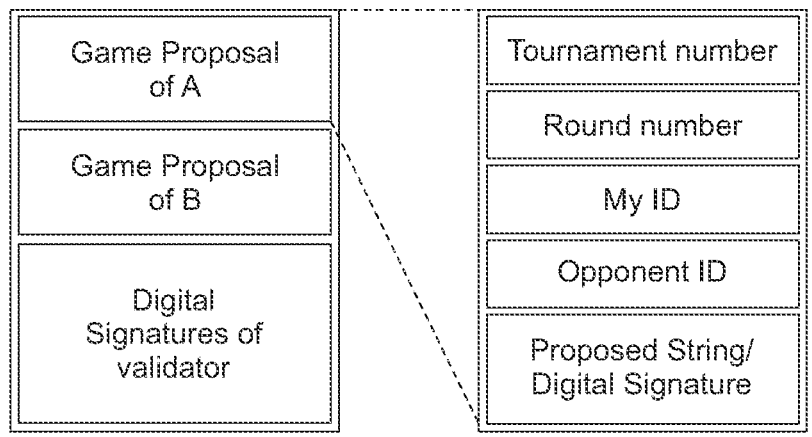

PoWin is a cryptographically secured certificate designed to maintain the state of users on a peer-to-peer network. It is tamper-proof as it contains the digitally signed game proposals of both the nodes involved in a match, as shown in FIG. 1. PoWin is a single certificate generated as the result of matches in Colosseum and gets distributed over the network. Winners of a round use their PoWin as a ticket to play the next round, whereas it works as a restriction for the losers and prevents them from moving ahead.

PoWin proves the occurrence of a match. A node on receiving conflicting PoWins of a user alert others with verifiable proofs (multiple PoWins for the same round or PoWin for a higher round of a player already lost in previous rounds).

Since the cryptography involved does not allow to generate fake PoWin certificates, it becomes evident that the user itself has performed such a task. Peers discard blocks proposed by these nodes and individually block them for a certain number of tournaments on multiple violations. Moreover, nodes are blocked on the basis of proofs available with the peers and therefore does not require a consensus between nodes.

1.2 Two Player Game

Colosseum uses a two-player game to eliminate nodes participating in the tournaments and select the final set of block proposers. Each node in the network performs three roles during a tournament.
  A Player forms a pair with an opponent and generate their game proposals.
  A Validator validates the game proposal from the involved players and generate PoWin certificate as a result, and
  A Keeper, responsible for storing the PoWin and verifying that the players are playing authorized matches.

1.2.1. Finding Competitors:

Pairing for the tournaments is not absolute in Colosseum. Participants find their opponents on the fly to avoid targeted attacks by malicious opponents. They send TCP requests to other nodes on the ring to play and provide the PoWin of the previous round as a token of their eligibility. Eligible nodes respond with their PoWin while others send a negative response.

1.2.2. Generating Game Proposals:

After pairing confirmation nodes generate their Game Proposal. Both the players digitally sign a common string $S_{ABtr}$ with their private key $p_k$ to generate proposed string (PS), refer equation (2). Validator compares PS of both the opponents with its signed $S_{ABtr}$ and the player with the value closer to that of the validator wins.

$$S_{ABtr} = \text{concat}(I_A, I_B, t, r) \tag{1}$$

$$PS = \text{sign}(p_k, S_{ABtr}) \tag{2}$$

Here, $I_A$ and $I_B$ are the Ids of the players ($I_A$ lesser than $I_B$), and t and r is the tournament and round number respectively. Digital signatures used to generate the proposals must be deterministic to ensure safety of the technique.

Moreover, the Public Key infrastructure should not be compromised, i.e., the players should not have multiple private keys to generate various game proposals which can result in a probabilistic advantage. It also prevents the validators from using different keys that can affect the outcome of a match.

1.2.3. Game Validation:

Colosseum delegates the validation and result computation of matches to a random third-party on the network known as validator.

Figure 2:
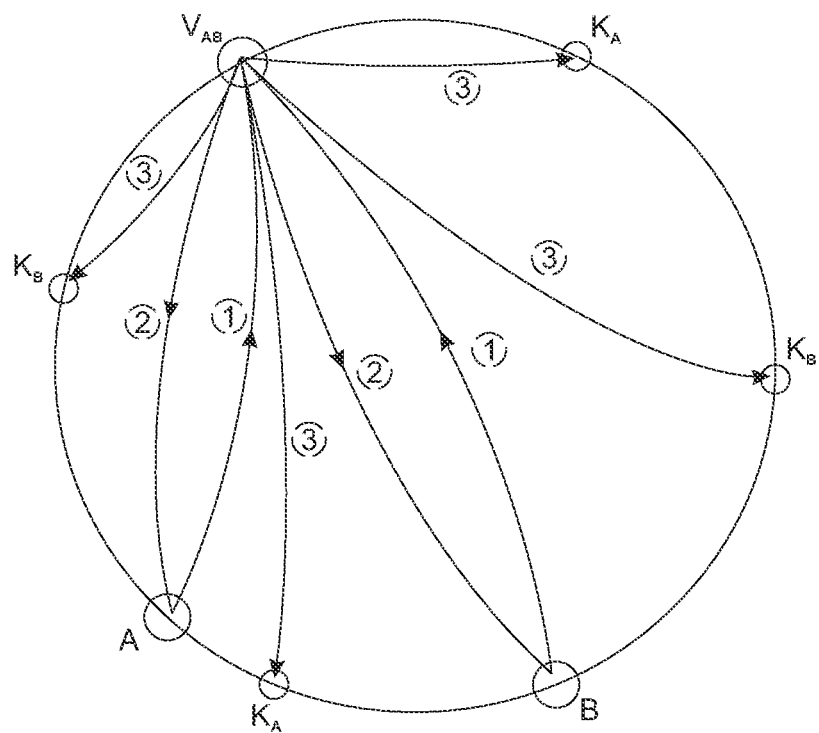
FIG. 2 depicts message flow of a match in Colosseum A, B are the players, $V_{AB}$ is the validator, and $K_A$, $K_B$ are the Keepers.

Validator is a randomly selected participant on the ring network uniquely identifiable for a match. Its responsibility is to validate the game proposals sent by the players involved, produce PoWin and forward it to the contestants and their keepers, as shown in FIG. 2.

Delegating the validation process prevents the competitors from leaving matches in-between, foreseeing the result. Selecting a random node to validate ensures that the game is fair unless the validator is biased. Moreover, the outcome of a match is verifiable; therefore, a malicious validator can at most drop a match if an ally is losing. In such a case, nodes not receiving results from the validator find other eligible contenders to play after a particular time.

$$V_{AB} = \text{hash}(S_{ABtr}) \quad (3)$$

Validator Id $V_{AB}$ depends on $S_{ABtr}$, as shown in equation (3). Dynamic pairing at run time influence $S_{ABtr}$ and therefore prevent targeted attacks on the validator. Using a common string $S_{ABtr}$ also restricts a player to select a validator of choice and hence provides a fair chance to both the players.

1.2.4. Storing Result:

Storing PoWin with the keeper is also an important design decision. Keeper manages the verifiable and tamper-proof state of users over a DHT. It restricts the participants (already lost or not eligible) from playing unauthorized matches; as the verification process which is independent of the players will identify any wrongful attempt by the players and notify it to others with verifiable proofs.

$$K_A = \text{hash}(\text{concat}(I_A, t, r)) \quad (4)$$

DHT root for the hash $K_A$ is considered as the keeper of a match, as shown in equation (4). To allow independent state verification (i.e., verifying the state of a player irrespective of its competitor) $K_A$ only depends on the Id of the player and the match information. Also, the keepers are different for every match because the same keeper can become a liability if malicious or can get attacked by some adversary.

Furthermore, a malicious or faulty keeper can result in loss of data and match verification can get affected. Thus, a PoWin is stored at multiple keepers evenly distributed over the ring to handle faults. Nodes can query any number of replicas to verify the state of a node for a match.

1.2.5. State Verification in Tournament Tree

Colosseum verifies all the matches of a tournament to make sure that only winning participants of a round proceed towards higher rounds. Its goal is to double-check the entire tournament tree in a top-down approach and helps to ensure that nodes play honestly and identify any unauthorized match played in a tournament.

To verify matches, keepers (all replicas) of a match query one or more previous round keepers (multiple replicas) of the players included in a PoWin. It is important because both the nodes playing $r_{th}$ round must have won earlier $(r-1)_{th}$ round. The querying keeper provides the PoWin for round r as a proof for a valid query (i.e., node has played the $r_{th}$ round), and the queried keeper reply with the PoWin of round r−1 to confirm the previous victory of the players. In case, the proof is not available with the queried keeper and query is valid, it broadcasts a negative vote against the match and queries the previous keeper using the same proof. A match is considered as a foul when a majority (>⅔rd of keepers) of negative votes from valid keepers are against it.

Example 2

CDAG (Converging Block Directed Acyclic Graph)

A directed acyclic graph (DAG), is a finite directed graph with no directed cycles. That is, it consists of finitely many vertices and edges (also called arcs), with each edge directed from one vertex to another, such that there is no way to start at any vertex v and follow a consistently-directed sequence of edges that eventually loops back to v again. Equivalently, a DAG is a directed graph that has a topological ordering, a sequence of the vertices such that every edge is directed from earlier to later in the sequence.

DAGs can model many different kinds of information. For example, a spreadsheet can be modeled as a DAG, with a vertex for each cell and an edge whenever the formula in one cell uses the value from another; a topological ordering of this DAG can be used to update all cell values when the spreadsheet is changed.

Figure 3:
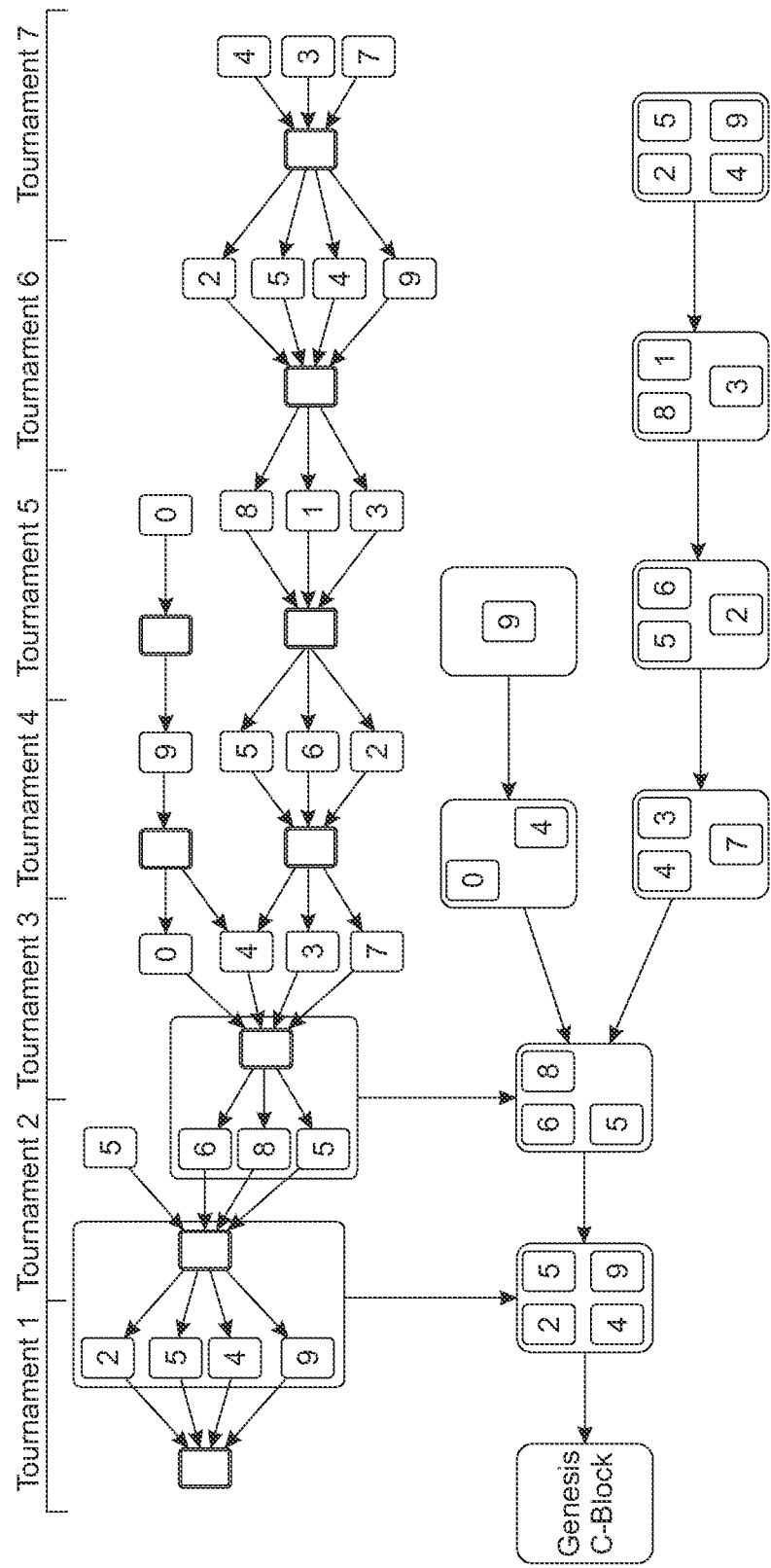
FIG. 3 depicts the progress of CDAG for the number of tournaments.

Converging Directed Acyclic Graph (CDAG) is introduced as a new structure to maintain distributed ledgers across peer-to-peer networks. It shares the same trust model as the traditional blockchain (blocks of transactions linked to each other progressing as a modification resistant ledger) and is designed to provide higher throughput. It adds C-Block as a new construct to the structure of blockchain to give the ability to commit multiple blocks simultaneously and use bucketing of transactions to minimize the conflicts. The structure progresses as a chain of C-Blocks as shown in (FIG. 3). C-Block provides finality to the locks added in CDAG and serialize the structure to support smart contracts.

Example 3

C-Block

C-Block (Converging block) is the converging point in CDAG. It is proposed as an extra layer between two layers of blocks providing a point of convergence to the blocks of the previous slot and a single point of reference for all the blocks of the current slot, shown in FIG. 3. As multiple blocks are proposed in each slot, a C-Block refers multiple non-conflicting blocks and contains the list of hashes of all the previous blocks it refers. A block consistent with a C-Block is bound to be consistent with all the blocks included in it. It allows the current block proposers to refer multiple blocks with a single link and enables different proposers to have the same view about the ledger.

Creation of C-Block is also the responsibility of the block proposers. While proposing a block, a proposer needs to make it consistent with a C-Block and includes a pointer to it. To do so a proposer can either generate a new C-Block or use an existing C-Block created and propagated by other selected proposers of the same tournament. In case of a conflict the heaviest chain rule is used to select the C-Block with greater probability to survive.

Generating a valid C-Block is a trivial process and obeys a specific set of rules. Proposers need to make sure that all the blocks included in a C-Block must:
1) belong to different buckets, to ensure that a C-Block does not contain conflicting blocks due to the presence of the same transactions;
2) have non-conflicting transactions, to avoid any double spending transactions in a C-Block, and
3) refer to the same previous C-Block, providing the serial nature to CDAG.

Blocks of a tournament with different previous C-Blocks are similar to a fork in the traditional blockchain. In FIG. 3 the block of bucket 9 points to a different C-Block than that of buckets 5, 6, 2 at tournament 4, i.e., the previous blocks of both the C-Blocks are different, creating a fork. Thus, the structure progresses as a chain where a C-Block can be viewed as a large block encapsulating all the blocks included in its list.

Results

To evaluate Colosseum, we deploy it on Google Cloud Platform using Google Kubernetes Engine having n1-high-mem-16 instances, each with 16 cores and 104 GB memory. Multiple Docker containers each running as a user of the structured layer run on these instances with a cap of 25 Mbps on their bandwidth. Users proposed 1 MByte blocks each with 2500-3000 transactions. We ran each experiment for at least 30 tournaments, and graphs show an average over all of them. We ran the experiments for three different configurations varying the block size and the time slot of the barrier, as shown in table 1.

TABLE 1

Configurations to test Colosseum

| Configuration | Block Size | Time slot |
| --- | --- | --- |
| Config 1 | 1 MB | 20 s |
| Config 2 | 0.75 MB | 15 s |
| Config 3 | 0.50 MB | 10 s |

We vary the number of nodes in network for multiple values of $\alpha$ and all the three configurations as mentioned in table 1. Both the FIGS. 4, and 5 show that for a fixed value of $\alpha$ the throughput of the system increases initially with the number of nodes and then starts to decrease. The initial increase is because the number of blocks for a tournament of Colosseum is directly proportional to the number of nodes. More number of nodes result in a higher degree of parallelism for CDAG and thus, increases the throughput. After a certain point, the throughput starts decreasing for all the different configurations in 4 and 5, due to the generation of a large number of simultaneous blocks. Bandwidth constraints and network congestion do not provide them enough time to reach everyone in the network. Also, it is visible from both the graphs that the network with smaller time slots saturates faster in comparison to that of a higher time slot even though the size of the block also increases in the same ratio.

FIGS. 4 and 5 also shows that for a fixed number of nodes, increasing the value of $\alpha$ results in lower throughput since the number of qualifying proposers is inversely proportional to $\alpha$. However, for larger values of $\alpha$ the saturation point shifts to a higher number of nodes. It allows CDAG to scale with the number of nodes. The value of $\alpha$ can be manipulated to achieve the optimum throughput for a given configuration similar to setting the hardness of the cryptographic puzzle in Bitcoin.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

REFERENCES

[1] Wikipedia.org. 2018. Distributed Hash Table. Retrieved 2018-17-07 from https://en.wikipedia.org/wiki/Distributed_hash_table
[2] Satoshi Nakamoto. 2008. Bitcoin: A peer-to-peer electronic cash system. https://bitcoin.org/bitcoin.pdf
[3] Alexandra Tran. 2018. An Introduction to the BlockDAG Paradigm. Retrieved 2018-11-26 from https://blog.daglabs.com/an-introduction-to-the-blockdag-paradigm-50027f44facb
[4] Hyperledger.org. 2018. PoET-Proof of Elapsed Time. Retrieved 2018-11-11 from https://sawtooth.hyperledger.org/docs/core/releases/latest/architecture/poet.html

What is claimed is:

1. A scalable and Byzantine fault tolerant method to reach consensus on a next set of block proposers in permissioned blockchain systems comprising the steps of:
a. forming a pair of nodes and generating respective block proposals for each node of the pair of nodes;
b. validating the respective block proposals from the pair of nodes of step (a) by a current validator, and generating a proof of win (PoWin) certificate as result; and
c. storing the PoWin certificate from step (b) by a current keeper and verifying that the pair of nodes are forming an authorized pair,
wherein the pair of nodes, the current keeper and the current validator are distinct nodes in a network, wherein the pair of nodes participate in a two-player knockout tournament to determine the next set of block proposers;
wherein the two-player knockout tournament includes multiple asynchronous rounds, each round of the multiple asynchronous rounds having a corresponding one or more keepers, the current keeper being a keeper for a match between the pair of nodes in a current round, the current round following a previous round, wherein the current keeper:
queries keepers of the previous round that are included in a PoWin certificate,
ensures both nodes pairing in the current round must have won the previous round,
queries a keeper collecting a PoWin certificate for the current round as a proof for a valid query indicating that a node has played the current round, and the queried keeper replies with the PoWin of the previous round to confirm a previous victory of the node, and in the absence of proof for a valid query, broadcasts a negative vote against the pair of nodes and queries keepers of the previous round using the proof, wherein the match is considered as a foul when more than half of negative votes from the keepers are against the match, wherein after pairing of the nodes, each node of the pair of nodes generates a respective block proposal by signing a common string $S_{ABtr}$ with a respective private key $p_k$ to generate a proposed string (PS), wherein the current validator (i) signs the common string $S_{ABtr}$ with the current validator's own private key, generating the current validator's own signed proposed string and (ii) compares (a) the PS of both nodes of the pair of nodes with (b) the current validator's own signed proposed string, and wherein a node with a proposed string that is closer to that of the current validator's own signed proposed string earns the PoWin certificate.

2. The method of claim 1, wherein pairing of the nodes is performed dynamically for each round of the two-player knockout tournament.

3. The method of claim 2, wherein for pairing of the nodes, the pair of nodes send TCP requests to other nodes on a ring network to pair and provide PoWin of a previous round as a token of their eligibility.

4. The method of claim 1, wherein the current validator is a random third party in a network, wherein the current validator is uniquely identifiable for a match.

5. The method of claim 1, wherein the current validator prevents the pair of nodes from leaving during a match.

6. The method of claim 1, wherein the current keeper stores the PoWin certificate as a verifiable and tamper-proof state of users over a Distributed Hash Table (DHT).

7. The method of claim 6, wherein the DHT restricts nodes that have already lost or are not eligible from forming unauthorized pairs.

8. The method of claim 6, wherein the current keeper is different for every pair of nodes to evade any malicious or attack by adversary.

9. The method of claim 1, wherein blocks proposed by the block proposers selected using steps (a), (b) and (c) are stored in a distributed ledger across peer-to-peer networks using a Converging Directed Acyclic Graph (CDAG).

10. The method of claim 9, wherein storing of the blocks progresses by adding a converging block (C-Block) to the CDAG, thereby providing an ability to (i) commit multiple blocks simultaneously and (ii) bucket transactions to minimize conflicts.

11. The method of claim 10, wherein the C-Block is a converging point in the CDAG allowing current block proposers to refer multiple blocks with a single link and enables different proposers to have the same view about the ledger.

12. The method of claim 10, wherein the C-Block:
   a. belongs to different buckets, to ensure that the C-Block does not contain conflicting blocks due to the presence of same transactions;
   b. has non-conflicting transactions, to avoid any double spending transactions in the C-Block, and
   c. refers to a previous C-Block, providing a serial nature to the CDAG.

13. The method of claim 10, wherein a number of qualifying proposers is inversely proportional to a number of rounds $\alpha$ in a tournament.

14. The method of claim 10, wherein for larger values of $\alpha$, saturation point shifts to a higher number of nodes, allowing the CDAG to scale with the number of nodes.

* * * * *